Nov. 28, 1950               L. BETTINI               2,531,870
AUTOMATIC APPARATUS FOR DRYING NOODLES AND SIMILAR
DOUGH-PRODUCTS BY MEANS OF A CYCLE COMPRISING
PROGRESSIVE RECOVERY AND REST PHASES
Filed Feb. 15, 1947                                  3 Sheets-Sheet 1
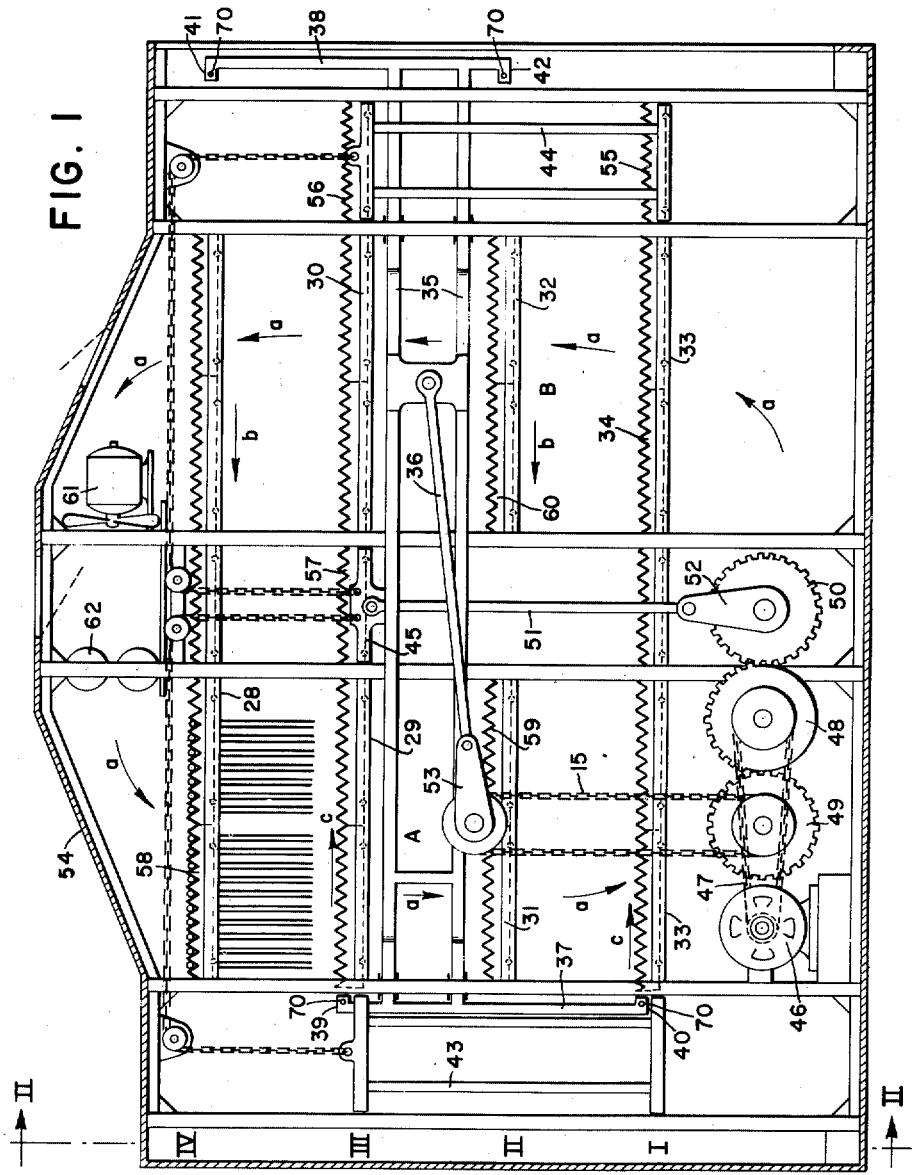
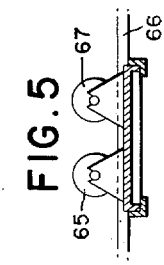
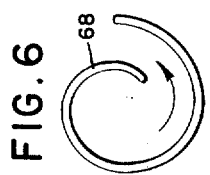
INVENTOR
LORENZO BETTINI
BY
ATTORNEY Nov. 28, 1950             L. BETTINI             2,531,870
AUTOMATIC APPARATUS FOR DRYING NOODLES AND SIMILAR
DOUGH-PRODUCTS BY MEANS OF A CYCLE COMPRISING
PROGRESSIVE RECOVERY AND REST PHASES Filed Feb. 15, 1947                            3 Sheets-Sheet 2

INVENTOR

LORENZO BETTINI

BY

ATTORNEY

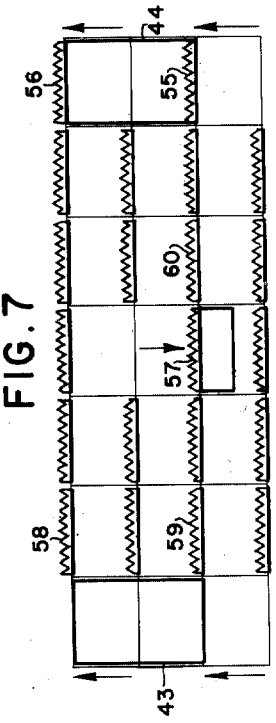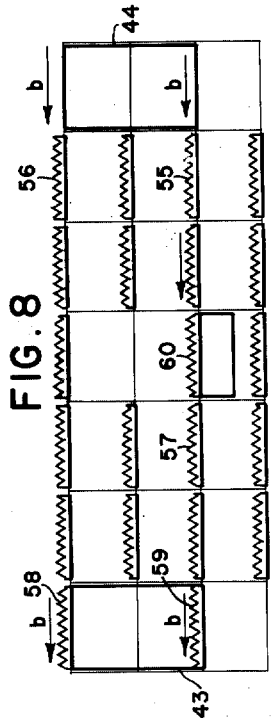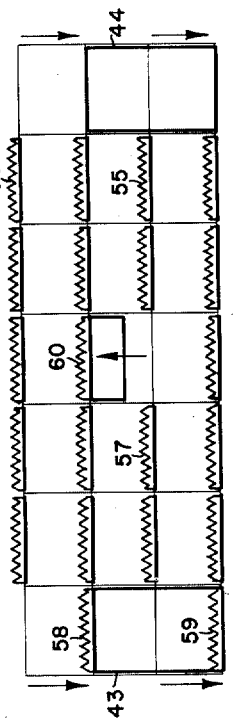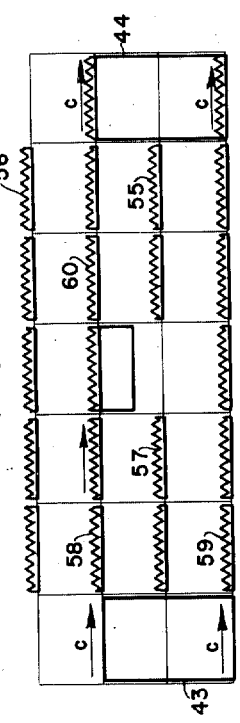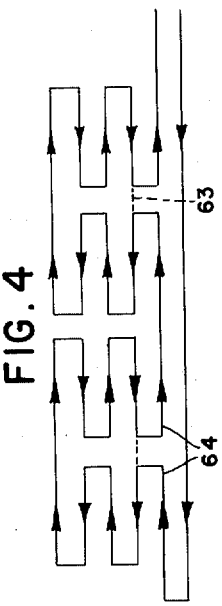
INVENTOR
LORENZO BETTINI
BY
ATTORNEY Patented Nov. 28, 1950

2,531,870

UNITED STATES PATENT OFFICE 2,531,870

AUTOMATIC APPARATUS FOR DRYING NOODLES AND SIMILAR DOUGH PRODUCTS BY MEANS OF A CYCLE COMPRISING PROGRESSIVE RECOVERY AND REST PHASES

Lorenzo Bettini, Rome, Italy

Application February 15, 1947, Serial No. 728,900
In Italy July 6, 1942

Section 1, Public Law 690, August 8, 1946
Patent expires July 6, 1962

9 Claims. (Cl. 34—190)

1

This invention relates to a self-acting apparatus for the drying of noodles and similar dough-products, according to a cycle, comprising a progressive recovery and resting period, meaning by "recovery" a rehumidification of the dough, which follows the superficial drying of the same.

The known dryers for noodles offers various disadvantages as to the quality and quantity of the dried product. One of said disadvantages is the irregular distribution of the drying air flow, which causes a different rate of drying between the different sides of the dough so that, as the process must be controlled according to a medium effect, a product is obtained which is badly dried and has therefore a lower commercial value.

Another disadvantage of the ordinary dryers is that the dough, getting quickly dried all over its outer surface, prevents the heat from reaching the inner layers thereof, so that one has a fair chance of having either unsatisfactorily dried dough which contains still a part of inner humidity, or dough, the outer surface of which has suffered an excessive drying, losing thereby that physical resistance to cooking, which is known to be one of the main features of this food.

In the common dryers, the time required for the drying of the noodles is a rather long one, which circumstance does not fail to exert a great influence upon the expenditures involved by the production and, consequently, upon the price of the goods.

An object of this invention is to embody a dryer in which the noodles reach at the perfect drying by passing through successive phases of surface-drying, resting and surface-softening, meaning by resting-phase the phase in which the noodles are not submitted to the action of any air-flow.

Still another object of this invention is to impart to the noodle-holding frames a shift, transversal in respect to the air-flow; such shift having the purpose of causing the frames to pass successively through all the zones of the chamber, in which zones air is having a different grade of humidity, and also through those zones in which the noodles are not exposed to any air-flow.

With this and other objects in view, as will appear as the description proceeds, the invention consists in the novel features of construction, combination of elements and arrangement of parts, and hereinafter to be fully described and pointed out in the appended claims.

In the accompanying drawings:

Fig. 1 is the longitudinal section of a form of practical embodiment of the dryer;

Fig. 3 is a diagram showing the itinerary of the dough inside the apparatus of Fig. 1;

Fig. 4 shows the way in which a plurality of apparatus can be connected in series;

Figs. 5 and 6 illustrate the particulars of a dryer for short-cut noodles;

Figs. 7 to 10 are diagrams illustrating more fully the operation of the apparatus of Figs. 1 and 2.

Figure 2:
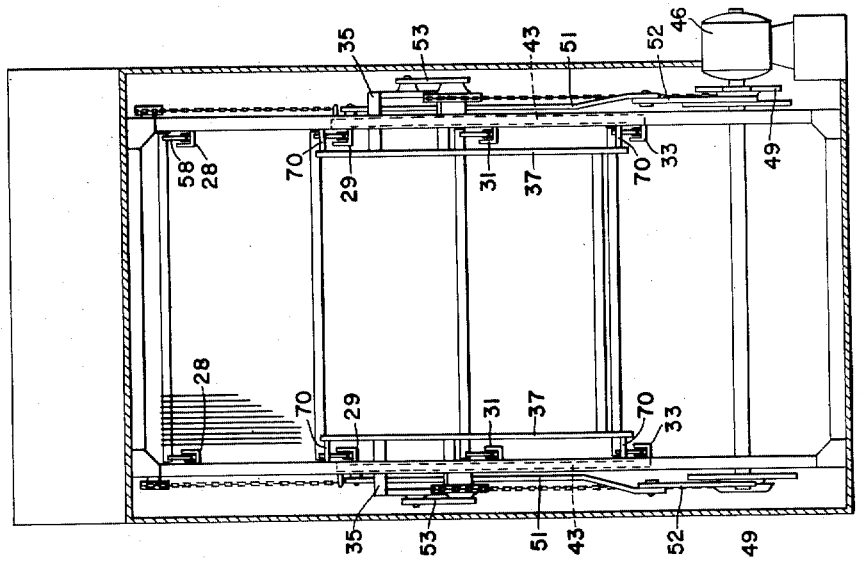
Fig. 2 is a cross-sectional view on the line IV—IV of Fig. 1.

With reference to Figs. 1 and 2, the apparatus is made of four tracks of rail, laid out along four floors superposed to each other. The tracks of the second and the third floors are interrupted at a shaft, in which is working the central goods elevator 45.

The tracks above mentioned are illustrated at reference characters 28, 29, 30, 31, 32 and 33.

The dough is carried on the rods of frames 34 which are moved along the said tracks by successive strokes. The frames are shifted by one stroke along the tracks when they are urged by the frame being raised up to the relative floor by the goods elevators 43 and 44 located at the terminals of the floors, respectively.

The motion for the frames is imparted by the truss 35, which is suitably guided and actuated through the connecting rod 36. Such truss supports, at its ends 37 and 38, terminal elements 39 and 40, and 41 and 42, respectively, provided with projections 70.

Figure 11:
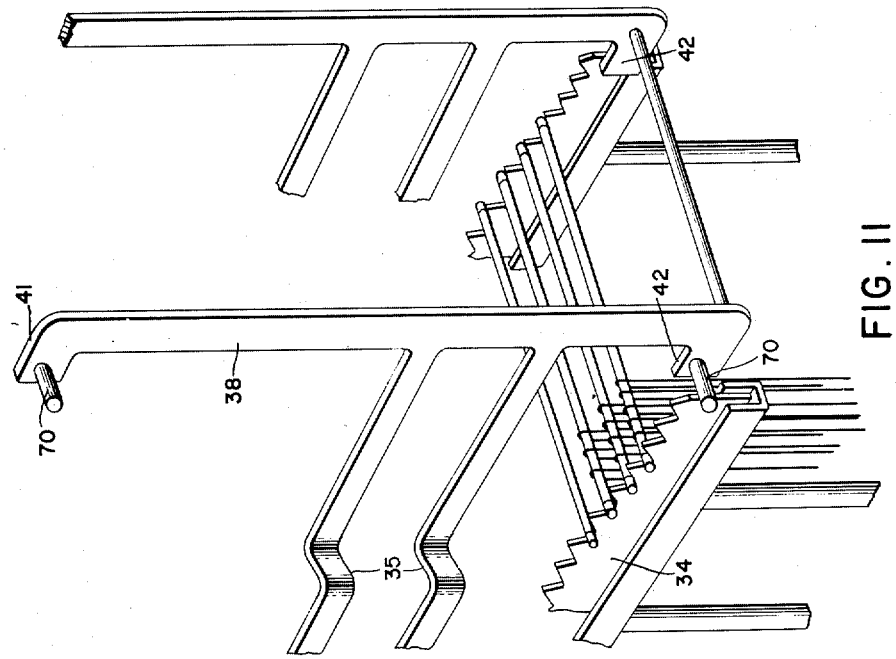
Fig. 11 is a detail of Fig. 1.

Figure 11 illustrates the particulars of one of the heads 38 of the truss 35, in such a manner as to bring into evidence the way in which the said head itself with the aid of projections 70 pushes forward the frame 34 which is on the goods elevator.

As one sees from Figure 1, the heads 37 and 38 are biased in respect of each other in such a way that the truss, during its stroke from left to right, will push the frames on to the first and third floors, whereas, during its return stroke, it will push those on to the second and the fourth floors. On the sides and in the central part of the apparatus are located the goods elevators 43, 44 and 45, of which the lateral ones are two-storied, whereas the central one is one-storied. Also these are biased in regard of their motion, in such a way that when the lateral ones descend the central one is rising and vice versa. The said goods elevators have the purpose of conveying the frames from one floor to another, and in a particular way, goods elevator 43 is effective during its descent from the fourth to the third floor respectively, from the second to the first floor only; the goods elevator 44 is effective during its ascension from the first to the second and from the third to the fourth floor only; the goods elevator 45 being effective both in descent and ascent between the second and the third floor. The motion of both the truss 35 and the goods elevators is derived from the following mechanism: by means of the chain 47, the motor 46 rotates the wheel 48 provided with gear teeth along the half of its peripheral length only, this wheel is meshing, by one-half of its revolution, with the wheel 49, and, by the other half of its revolution, with the wheel 50. Hence, the said two wheels will accomplish half a revolution alternately. The device composed of the connecting rod 51 and the crank-lever 52 actuates the said goods elevators, whereas the connecting rod 36 and the crank-lever 53 are actuating the truss 35. At the right-hand end of the housing 54 is provided an opening (not shown in the figure) for the introduction into the said housing of the frames which carry the dough to be dried, and for the exit from the said housing of the frames which carry the already dried paste.

The assembly enclosed within the housing 54 embodies the cycle, schematically illustrated in Figures 7, 8, 9 and 10, in the following manner (the initial positions are those shown in Figure 1):

First phase (Figure 7): the lateral goods elevators are rising; the goods elevator 44 raises the two frames 55 and 56 up to the level of the second and the fourth floor, respectively, stopping there; at the same time the goods elevator 43 is rising empty. Contemporaneously, the central goods elevator, during its descent, carries the frame 57 down to the level of the second floor (in this phase the truss 35 is motionless).

Second phase (Figure 8): the truss 35 is executing its stroke from the right to the left, and pressing against the frames 56 and 55 by the extensions 70 of the relative end-pieces 41 and 42 it pushes all the frames of the second and the fourth floors in the same sense.

The frames 58 and 59 are going to be located within the goods elevator 43 which, in this phase, is stopping at the level of the floors above mentioned; at the same time the frame 60 is being loaded upon the central goods elevator which has been stopping at the second floor.

Third phase (Figure 9): while the truss 35 is remaining motionless, the central goods elevator is rising, taking the frame 60 up to the third floor. The goods elevator 43 descends, taking the frame 58 down to the third floor, and the frame 59 to the first floor; during this the goods elevator 44 is descending unloaded.

Fourth phase (Figure 10): the truss 35 is executing its stroke from the left to the right, pushing the frames 58 and 59, stopping on goods elevator 43 at the level of the first and third floor respectively, and so on, obtaining thus the cycle of Figure 3.

In Figure 1, the arrows marked with a show the itinerary followed by the flow of hot air due to the action exerted by the fan 61; the arrows, marked with b and c show the direction of the shift of the frames along the various floors. From an examination of the motion as accomplished by the frames, one sees that the said frames are filling up at all times the whole drying chamber so that the hot air flow, during its itinerary as represented by the arrows a, is compelled to enfold the dough always in the same sense of the length thereof.

On the other hand we see that the frames carrying the dough during the while in which they are still on the lateral goods elevators 44 and on the central one 45 are not enfolded by the said hot air flow, they are in a phase of recovery.

Let us look now into the action exerted by the hot air upon the dough.

The air discharged by the fan 61 crosses the heating element 62, becomes heated up and goes to exert its impact upon the dough carrying frames which are within the zone A on the left-hand side in respect of the drying chamber (when looking at Figure 3).

The dough which is on the upper frames will quickly dry out all over external surfaces by yielding its humidity to the air, which, upon enfolding the lower frames, will produce there a progressively decreasing drying action so that when the air is passing into the right-hand section of the apparatus (zone B) it will be so rich with humidity that instead of producing a drying of the dough, the air will rather moisten the outer surface of the dough, softening the same.

Such moistening with the softening deriving therefrom is termed as "recovery."

The dough which was the first to be enfolded by the hot air flow within the zone A becomes dried externally, whereas its inner portions still contain a rather high quantity of humidity. During the stay of the dough on the goods elevators, it is no longer exposed to the action exerted by the hot air so that the humidity which has remained in the inner portions of the dough will gradually shift toward the surface. When the dough is enfolded by the flow of air enriched with humidity, within the zone B, externally it softens again, allowing for the inner humidity which has shifted toward the surface, to become eliminated successively, when the dough will become enfolded by the dry hot air flow again.

It has been disclosed by the practice, after a stay of about 24 hours within the drying chamber, the dough proves to be perfectly dry in a uniform way throughout the bulk. In this way there will be avoided every danger deriving from the swelling or the moldiness of the dough. The time necessary for the drying of the same quantity of dough within drying chambers working with fixed frames proved to be of about three days; nevertheless, the dough never proved to be dried uniformly.

The apparatus can be put in series with other ones so as to ensure a continuous output. In similar case, the operative cycle will be similar to that represented in Figure 4 in which is shown that either by adding the itinerary 63 and by doing away with the itinerary 64, we obtain the passage from a cycle in series into a single one.

The same apparatus might serve also for the drying of short dough. As a matter of fact, it will be sufficient to replace the frames carrying the rods whereon the dough is set astride by frames, carrying in the manner shown in Figure 5, a plurality of receptacles from which the dough can not spread outward, but which are crossed by the hot air flow, nevertheless. Such receptacles can be made in the shape of pipes or have evolving sections as illustrated at 68 in Figure 6, or any other sections suitable for the purpose; they can have walls made of metal nettings or of any other perforated material. At their ends, the receptacles are provided with the rings 65 apt to roll over the auxiliary pipes with evolving cross-section have the advantage of eliminating any kind of port for loading and unloading the product. In fact, by rolling in the sense shown by the arrow (Figure 6), they prevent the outlet of the noodles while they permit the said outlet by rolling in the opposite direction.

I claim:

1. Apparatus for drying noodles and the like, comprising a housing, means for setting up current of heated air along the inside walls of said housing in a substantially closed circuit therealong whereby zones are established which are covered and zones not covered by the air flow, a plurality of conveying rails in a stacked parallel relationship, at least one pair of intermediate stackwise adjacent rails lacking at least one rail portion, a recess being provided thereby, said recess being situated substantially within said zone of no-air-flow, a plurality of individual noodle carriers disposed for movement along said rails, means for effecting a lateral displacement of said carriers alternately in opposite directions on alternate rails, elevators for said carriers disposed for vertical movement adjacent the respective ends of said rails and an elevator disposed in said recess, means for operating said elevators and said lateral displacement means, and means for effecting a given synchronized sequence to the action of said elevators and said displacing means, whereby said carriers are sequentially shifted from zones of air flow into the no flow zone and back into said zones of air flow, in a continuous path.

2. Apparatus according to claim 1, wherein said air current setting-up means comprises a fan and an air heater.

3. Apparatus according to claim 1, wherein said rails comprise each a pair disposed one above the other in a four-story arrangement, the two intermediate rail pairs being interrupted at the central portions thereof.

4. Apparatus according to claim 1, wherein said carriers comprise sliding frames and transverse rods thereon for the noodles.

5. Apparatus according to claim 1, wherein said carriers comprise sliding frames and transverse cylindrical containers for the noodles.

6. Apparatus according to claim 3, wherein said displacement means comprises a structural member disposed for reciprocating movement within said housing having vertical extensions for engagement respectively with said carriers on the second and fourth, and on the first and third floor rails respectively.

7. Apparatus according to claim 3, wherein said elevators adjacent the ends of said four-storied rails comprise each a structure having two platforms for receiving carriers being laterally displaced on every other of said stacked rails, the travel of said respective platforms being between vertically adjacent rails, and said elevator in the recess having a single platform, the travel thereof being between said two intermediate rail pairs.

8. Apparatus according to claim 1, wherein said operating means comprises a driving motor.

9. Apparatus according to claim 3, wherein said sequence effecting means comprises a gear train and transmission means linking said train, said elevators and displacement means, operated from said operating means, said gear train including a gear having a partially meshing surface.

BETTINI, LORENZO.

REFERENCES CITED

The following references are of record in the file of this patent:

UNITED STATES PATENTS

| Number | Name | Date |
|---|---|---|
| 346,344 | Bailey | July 27, 1886 |
| 694,767 | Mahoudeau | Mar. 4, 1902 |
| 789,186 | Von Susskind | May 9, 1905 |
| 1,168,722 | Guano | Jan. 18, 1916 |
| 1,252,650 | Barr | Jan. 8, 1918 |
| 1,445,011 | Fontana | Feb. 13, 1923 |
| 1,577,589 | Rapp | Mar. 23, 1926 |
| 1,646,259 | Roberts | Oct. 18, 1927 |
| 1,689,099 | Applegate, Jr. | Oct. 23, 1928 |
| 1,881,063 | Randolph | Oct. 4, 1932 |
| 2,074,458 | Cavagnaro | Mar. 23, 1937 |